United States Patent
Magzimof et al.

(10) Patent No.: US 11,561,107 B2
(45) Date of Patent: Jan. 24, 2023

(54) VEHICLE ROUTING EVALUATION BASED ON PREDICTED NETWORK PERFORMANCE

(71) Applicant: Phantom Auto Inc., Mountain View, CA (US)

(72) Inventors: Shay Magzimof, Palo Alto, CA (US); David Parunakian, Moscow (RU)

(73) Assignee: Phantom Auto Inc., Mountain View, CA (US)

( * ) Notice: Subject to any disclaimer, the term of this patent is extended or adjusted under 35 U.S.C. 154(b) by 866 days.

(21) Appl. No.: 16/434,150

(22) Filed: Jun. 6, 2019

(65) Prior Publication Data

US 2019/0383624 A1    Dec. 19, 2019

Related U.S. Application Data

(60) Provisional application No. 62/685,802, filed on Jun. 15, 2018.

(51) Int. Cl.
| | | |
|---|---|---|
| *H04W 8/00* | (2009.01) | |
| *G01C 21/34* | (2006.01) | |
| *H04W 8/08* | (2009.01) | |
| *H04B 17/373* | (2015.01) | |

(52) U.S. Cl.
CPC ....... *G01C 21/3453* (2013.01); *H04B 17/373* (2015.01); *H04W 8/08* (2013.01); *G01C 21/3492* (2013.01)

(58) Field of Classification Search
CPC ............ G01C 21/3453; G01C 21/3492; G01C 21/3461; H04B 17/373; H04W 8/08; H04W 36/30; H04W 36/32
See application file for complete search history.

(56) References Cited

U.S. PATENT DOCUMENTS

| | | | |
|---|---|---|---|
| 10,386,836 B2 | 8/2019 | Lockwood et al. | |
| 2017/0089710 A1* | 3/2017 | Slusar | G01C 21/3807 |
| 2018/0365908 A1* | 12/2018 | Liu | G06N 5/003 |
| 2019/0001191 A1 | 1/2019 | Lockwood et al. | |
| 2019/0011910 A1* | 1/2019 | Lockwood | G08G 1/165 |
| 2019/0107406 A1* | 4/2019 | Cox | G01S 19/42 |

(Continued)

OTHER PUBLICATIONS

Yan-Jin Wu, Aug. 2010, A dynamic navigation scheme for vehicular ad hoc networks, IEEE, p. 1-5.*

(Continued)

*Primary Examiner* — Lakeram Jangbahadur
(74) *Attorney, Agent, or Firm* — Fenwick & West LLP

(57) ABSTRACT

A vehicle routing evaluation system makes predictions about network performance data along road segments relevant to navigation of a vehicle and generates routing instructions or recommendations based in part on the network performance data. The vehicle routing evaluation system may send control signals to automatically control navigation of the vehicle to follow the routing generated routing or may present the navigation instructions to a teleoperator that controls the vehicle. Alternatively, the vehicle routing evaluation system generates a display with a navigational map overlay providing visual cues indicative of predicted wireless performance along various road segments to enable the teleoperator to select between possible routes.

16 Claims, 5 Drawing Sheets

(56) References Cited

U.S. PATENT DOCUMENTS

2019/0258246 A1 8/2019 Liu et al.
2020/0057436 A1 2/2020 Boda et al.

OTHER PUBLICATIONS

Abouzeid, A. A. et al., "TCP in Networks with Abrupt Delay Variations and Random Loss," IEEE, Feb. 2001, pp. 726-730.
Altman, E. et al., "A Stochastic Model of TCP/IP with Stationary Random Losses," SIGCOMM '00: Proceedings of the conference on Applications, Technologies, Architectures, and Protocols for Computer Communication, Aug. 2000, pp. 231-242.
Arianpoo, N. et al., "How network monitoring and reinforcement learning can improve tcp fairness in wireless multi-hop networks," EURASIP Journal on Wireless Communications and Networking, Dec. 2016, pp. 1-15.
Balakrishnan, H. et al., "A comparison of mechanisms for improving TCP performance over wireless links," IEEE/ACM Transactions on Networking, 5(6), Dec. 1997, pp. 756-769.
Barman, D. et al., "Effectiveness of loss labeling in improving TCP performance in wired/wireless networks," Proceedings—10th IEEE International Conference on Network Protocols, Dec. 2002, pp. 1-10.
Blanc, A. et al., "Compound TCP with random losses," International Conference on Research in Networking, May 2009, pp. 482-494.
Bregni, S. et al., "Enhanced loss differentiation algorithms for use in TCP sources over heterogeneous wireless networks," IEEE Global Telecommunications Conference, Dec. 2003, pp. 1-5.
Carlucci, G. et al., "Analysis and design of the google congestion control for web real-time communication (WebRTC)," Proceedings of the 7th International Conference on Multimedia Systems—MMSys '16, May 2016, pp. 1-12.
Cen, S. et al., "End-to-end differentiation of congestion and wireless losses," IEEE/ACM Transactions on Networking, 11(5), Oct. 2003, pp. 703-717.
Cheng, R.-S. et al., "Congestion control with dynamic threshold adaptation and cross-layer response for TCP Vegas over IEEE 802.11 wireless networks," International Journal of Communication Systems, Feb. 2013, pp. 2918-2930.
Cicco, L. et al., "TCP Congestion Control over HSDPA: An Experimental Evaluation," 2014 22nd Mediterranean Conference on Control and Automation (MED), Jun. 2014, pp. 1043-1048.
Edwan, T. A., "Improved algorithms for TCP congestion control," Doctoral Thesis, Loughborough University, Aug. 2010, pp. 1-220.
Elaarag, H. et al., "Using fuzzy inference to improve TCP congestion control over wireless networks," Proceedings of the 15th Communications and Networking Simulation Symposium, Mar. 2012, pp. 1-7.
Floyd, S. et al., "Random Early Detection Gateways for Congestion Avoidance," IEEE/ACM Transactions on Networking, 1(4), Aug. 1993, pp. 397-413.
Fonseca, N. et al., "Bayesian Packet Loss Detection for TCP," Proceedings 24th Annual Joint Conference of the IEEE Computer and Communications Societies. (INFOCOM 2005), Mar. 2005, pp. 1826-1837.
Geurts, P. et al., "A machine learning approach to improve congestion control over wireless computer networks," Fourth IEEE International Conference on Data Mining (ICDM'04), Nov. 2004, pp. 383-386.
Guo, D. et al., "Bayesian inference of network loss and delay characteristics with applications to TCP performance prediction," IEEE Transactions on Signal Processing, 51(8), Aug. 2003, pp. 2205-2218.
Haley, P. J. et al., "Neural Generalized Predictive Control," NASA Technical Memorandum 110244, Feb. 1997, pp. 1-17.
Jayaraj, A. et al., "Loss classification in optical burst switching networks using machine learning techniques: improving the performance of TCP," IEEE Journal on Selected Areas in Communications, 26(6), Aug. 2008, pp. 45-54.
Johansson, I. et al., "Self-Clocked Rate Adaptation for Multimedia," Internet Engineering Task Force (IETF), Dec. 2017, pp. 1-36.
Khurshid, A. et al., "Modified TCP New Reno for wireless networks," 2015 International Networking Systems and Security (NSysS), Jan. 2015, pp. 1-6.
Lakshman, T. V. et al., "TCP/IP performance with random loss and bidirectional congestion," IEEE/ACM Transactions on Networking, 8(5), Oct. 2010, pp. 541-555.
Lakshman, T. V. et al., "The performance of TCP/IP for networks with high bandwidth-delay products and random loss," IEEE/ACM Transactions on Networking, 5(3), Jun. 1997, pp. 336-350.
Lar, S. et al., "An initiative for a classified bibliography on TCP/IP congestion control," Journal of Network and Computer Applications, Jan. 2013, pp. 126-133.
Li, W. et al., "Dynamic Generalization Kanerva Coding in Reinforcement Learning for TCP Congestion Control Design (Extended Abstract)," Proc. of the 16th International Conference on Autonomous Agents and Multiagent Systems (AAMAS 2017), May 2017, pp. 1598-1600.
Lochert, C. et al., "A survey on congestion control for mobile ad hoc networks," Wireless Communications and Mobile Computing, 7(5), Apr. 12, 2007, pp. 655-676.
Lovewell, R. et al., "Packet-Scale Congestion Control Paradigm," IEEE/ACM Transactions on Networking, 25(1), Jul. 29, 2016, pp. 306-319.
Ma, C. et al., "A Game Theory Based Congestion Control Protocol for Wireless Personal Area Networks," Journal of Sensors, Dec. 7, 2015, pp. 1-13.
Maheshwari, G. et al., "A Survey on Congestion Control in MANET," International Journal of Computer Science and Information Technologies, 5(2), Mar. 2014, pp. 998-1001.
Mareček, J. "Signalling and obfuscation for congestion control," International Journal of Control, 88(10), Aug. 12, 2015, 2086-2096.
Meier, R. et al., "A Sensor Fusion Based User Interface for Vehicle Teleoperation," Proceedings of the IEEE FSR, vol. 60, Aug. 1999, pp. 653-660.
Milenkoski, A. et al., "Loss Differentiation Algorithms vs. Congestion Control Schemes: Dynamics and Performance," International Journal of Distributed and Parallel Systems, 1(1), Sep. 2010, pp. 13-30.
Mirza, M. et al., "A Machine Learning Approach to TCP Throughput Prediction," IEEE/ACM Transactions on Networking, 18(4), Aug. 2010, pp. 1026-1039.
Mittal, R. et al., "TIMELY: RTT-based Congestion Control for the Datacenter," The 2015 ACM Conference on Special Interest Group on Data Communication (SIGCOMM), Aug. 2015, pp. 537-550.
Parsa, C. et al., "Differentiating congestion vs. random loss: a method for improving TCP performance over wireless links," Wireless Communications and Networking Conference, Sep. 2000, pp. 90-93.
Peng, J., "Performance of TCP Congestion Control in UAV Networks of Various Radio Propagation Models," International Journal of Computer Networks & Communications, 8(2), Mar. 2016, pp. 1-12.
Sawhney, A. et al., "Congestion Control in Wireless Communication Network Using Fuzzy Logic and Machine Learning Techniques," International Journal of Advanced Research in Electrical, Electronics and Instrumentation Engineering, vol. 3, Issue 11, Oct. 2014, pp. 12825-12832.
Sundaresan, S. et al., "TCP congestion signatures," Internet Measurement Conference, Nov. 2017, pp. 64-77.
Utsumi, S. et al., "A new high-performance TCP friendly congestion control over wireless networks," Journal of Network and Computer Applications, 41(1), Feb. 2014, pp. 369-378.
Wang, Y. et al., "Performance analysis of a feedback congestion control policy under non-negligible propagation delay," Aug. 1991, pp. 149-157.
Widmer, J. et al., "Probabilistic Congestion Control for Non-adaptable Flows," Proceedings of the 12th International Workshop on Network and Operating Systems Support for Digital Audio and Video, May 2002, pp. 13-21.

(56) References Cited

OTHER PUBLICATIONS

Winstein, K. et al., "TCP ex Machina: Computer-Generated Congestion Control," Proc. ACM Conference on Communications Architectures, Protocols and Applications (SIGCOMM'13), vol. 43, Aug. 2013, pp. 123-134.
Wu, R.-Q. et al., "An Improved TCP Congestion Control Algorithm of Based on Bandwidth Estimation in Heterogeneous Networks," Journal of Communications, 9(10), Oct. 2014, pp. 792-797.
Zhu, X. et al., "NADA: A Unified Congestion Control Scheme for Real-Time Media," Dec. 2017, pp. 1-26.

* cited by examiner

VEHICLE ROUTING EVALUATION BASED ON PREDICTED NETWORK PERFORMANCE

CROSS-REFERENCE TO RELATED APPLICATIONS

This application claims the benefit of U.S. Provisional Patent Application No. 62/685,802, filed on Jun. 15, 2018, the contents of which are incorporated by reference herein.

BACKGROUND

Technical Field

This disclosure relates generally to connected vehicles, and more specifically to evaluating possible routes of a connected vehicle based on predicted network performance at geographic locations along the different possible routes.

Description of the Related Art

Recent advances in autonomous vehicle technologies promise to revolutionize all kinds of ground transportation, including private motor cars, cargo truck fleets, and the taxi industry. Achieving a safety level of such intelligent transport systems (ITS) at least equal to that of experienced human drivers and eventually surpassing it is the foremost concern of ITS developers.

However, as the self-driving car technology is in a nascent stage, it is inevitable that vehicles will encounter situations where the confidence level of its decision making algorithms is too low to safely proceed (such as when encountering road construction or rare types of obstacles). Furthermore, a desired route of an autonomous vehicle may involve traversing a road segment where autonomous driving is not permitted legislatively. In such cases, human intervention is desired.

In a teleoperation system, a vehicle establishes an on-demand connection over the Internet to a remote teleoperator station that enables a remote human driver or remote artificial intelligence agent to obtain a real-time video of the vehicle environment and to remotely drive the vehicle through a road segment. However, undesired signal latency can present a significant challenge to safe teleoperation. High-latency or variable-latency feedback may prevent the teleoperator from making timely decisions based on an up-to-date understanding of the road situation and may therefore be detrimental to vehicle safety.

SUMMARY OF THE EMBODIMENTS

A method evaluates a vehicle route based on predicted network quality. A current state of a vehicle including a vehicle location and a desired destination of the vehicle are obtained. Based on the current state of the vehicle, a network performance database is queried to obtain respective network performance data associated with a plurality of road segments within a vicinity of the vehicle location. Utility scores are generated for each of the plurality of road segments based on the respective network performance data. A navigation route from the vehicle location to the desired destination is determined based in part on the utility scores. The navigation route is outputted to a vehicle navigation controller. The vehicle navigation controller may comprise a navigation system in the vehicle or a remote teleoperation server that generates controls for controlling navigation of the vehicle.

In an embodiment, a navigation map of a geographic region within the vicinity of the vehicle location is generated that includes visual indicators representative of the utility scores associated with the plurality of road segments. In another embodiment, an augmented reality view of a video stream received from the vehicle is generated that includes visual indicators on road segments in the video stream representative of the utility scores.

In one embodiment, a speed constraint is determined based on the utility scores for the plurality of road segments that allows for safe operation the vehicle while traversing each of the plurality of road segments in the navigation route. The speed constraint may be determined by predicting a latency associated with transmission of a video stream from the vehicle to a remote teleoperation server, determining an object speed associated with the object, determining a total estimated time to react to the vehicle approaching an object, and determining a speed that provides the remote teleoperation server sufficient time to prevent the vehicle from colliding with the object given the object speed and the latency.

In another embodiment, speed limits associated with the plurality of road segments are obtained and a subset of the road segments are identified that have speed limits consistent with the determined speed constraint. The navigation route may then be determined based on the identified subset of road segments.

DETAILED DESCRIPTION

A vehicle routing evaluation system makes predictions about network performance data along road segments relevant to navigation of a vehicle and generates routing instructions or recommendations based in part on the network performance data. The vehicle routing evaluation system may send control signals to automatically control navigation of the vehicle or may present the navigation instructions to a teleoperator that controls the vehicle. Alternatively, the vehicle routing evaluation system generates a display with a navigational map overlay providing visual cues indicative of predicted wireless performance along various road segments to enable the teleoperator to select between possible routes.

Figure 1:
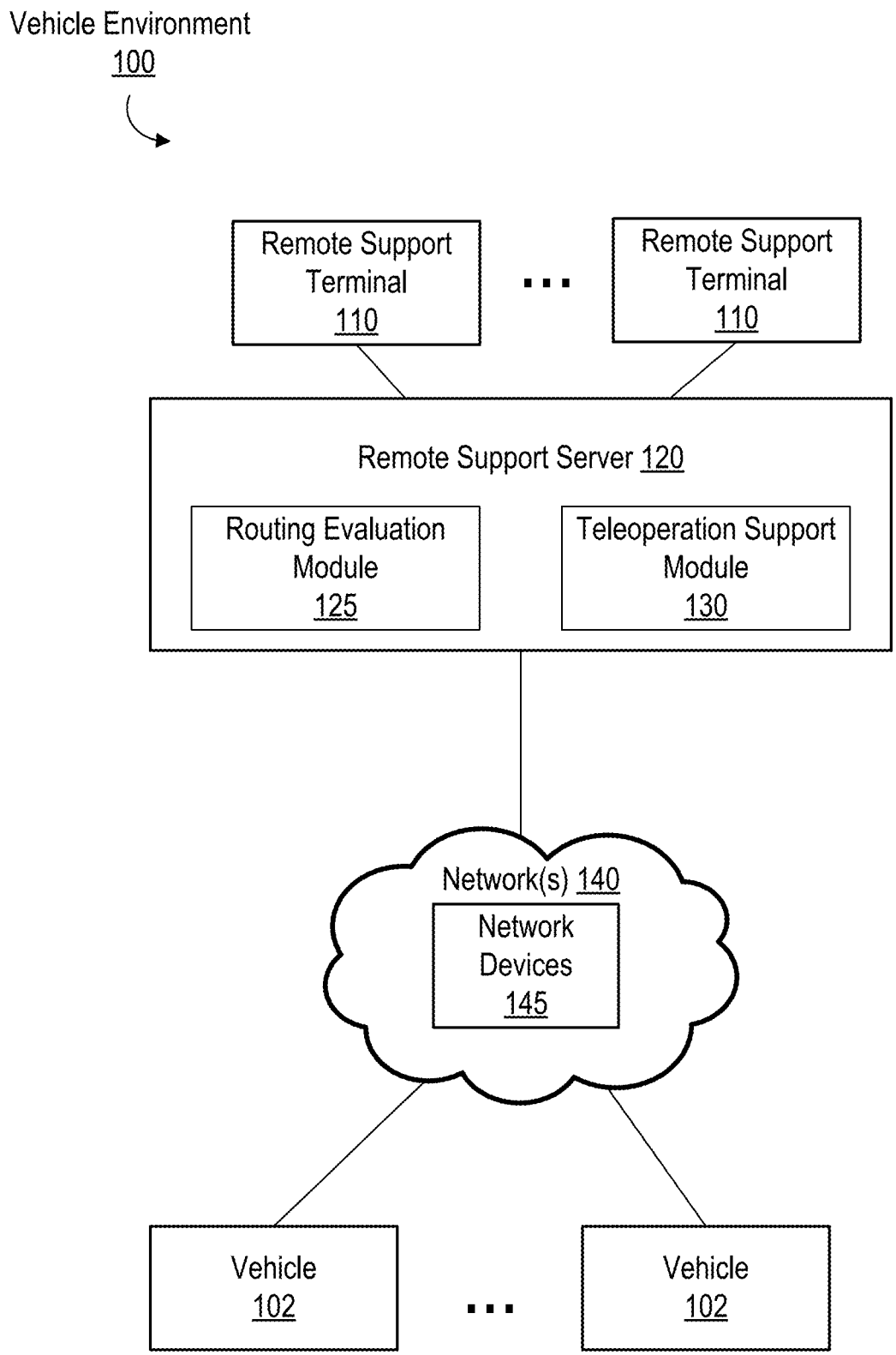
FIG. 1 is a block diagram illustrating an example embodiment of a vehicle environment.

FIG. 1 is a block diagram of a vehicle environment 100 including a plurality of vehicles 102, a remote support server 120 supporting one or more remote support terminals 110, and one or more networks 140 comprising network devices 145. In alternative embodiments, the vehicle environment 100 may include different or additional components.

The vehicle 102 comprises a land vehicle (e.g. a car or truck), a seaborne vehicle, a subterranean vehicle, an airborne vehicle, or other vehicle. The vehicle 102 may comprise an intelligent transport system (ITS) that connects to one or more networks 140 and communicates with one or more entities via the one or more networks 140 (e.g., the remote support server 120 and/or other vehicles 102) to enable the vehicle 102 to obtain information useful to safe navigation of an environment. In an embodiment, the vehicle 102 may comprise an autonomous or semi-autonomous vehicle that includes an autonomous driving system that automatically controls navigation based on sensed environment conditions. Alternatively, the vehicle 102 may comprise a non-autonomous vehicle that relies on control inputs from a driver in the vehicle 102 or from the remote support server 120. In the case of teleoperation, the vehicle 102 wirelessly receives control inputs via the one or more networks 140 that control various components of the drive system such as the steering system, acceleration, braking, etc. The vehicle 102 may also comprise various sensors that capture image data and other environmental data that may be streamed over one or more networks 140 to a remote support server 120 or to other vehicles 102.

The vehicle 102 may depend on a reliable network connection for streaming video or other sensor data to the remote support server 120 and for receiving control commands or data used by the vehicle 102 to navigate in a safe and efficient manner. For example, to provide teleoperation support to a vehicle 102, it is important that the video stream is received at the remote support server 120 in real-time with a latency as low as possible. Therefore, the vehicle 102 may switch between different networks 140, may switch between different connections to different network devices 145 of the networks 140, and/or may maintain multiple simultaneous connections to optimize its connectivity. Furthermore, the vehicle 102 may navigate in a manner that optimizes its connectivity performance as described in further detail below.

The remote support server 120 includes a teleoperation support module 130 that communicates with a vehicle 102 to provide remote teleoperation or other support services. In an embodiment, the teleoperation support module 130 may provide teleoperation support in instances when extra assistance is desired. For example, the vehicle 102 may request teleoperation assistance from the teleoperation support module 130 when one or more vehicle sensors fail, when an unknown problem occurs with the vehicle's autonomous driving software, when the vehicle 102 encounters a barrier or other hazardous road conditions, or when a passenger manually requests remote assistance. Furthermore, the teleoperation support module 130 may provide teleoperation support when the vehicle 102 enters a geographic region where it is not legally permitted to operate in a completely autonomous way. Upon requesting remote support, a video stream capturing the vehicle environment may be provided by the vehicle 102 to the teleoperation support module 130 and presented at a remote support terminal 110. A human teleoperator at the remote support terminal 110 may view the video stream on a display to assess the situation and take appropriate action via a control input device at the remote support terminal 110. In this embodiment, the teleoperation support module 130 may present real-time video streamed from the vehicle 102 to a display of the remote support terminal 110 and may provide real-time control data to the vehicle 102 received via the remote support terminal 110 to enable the teleoperator remotely drive the vehicle 102. Alternatively, the teleoperation support module 130 may comprise an artificial intelligence agent that does not necessarily require a remote support terminal 110 with a display or physical controls for providing human input. Here, the teleoperation support module 130 may provide control instructions to the vehicle 102 directly based on the processing of a real-time video feed and other sensor data streamed to the teleoperation support module 130 from the vehicle 102. In alternative embodiments, the teleoperation support module 130 may comprise a semi-robotic agent that interacts with a remote support terminal 110 in a similar manner as a human teleoperator.

In other embodiments, the remote support server 120 may provide different support to the vehicle 102 that does not necessarily involve teleoperation. For example, the remote support server 120 may provide voice support to a driver or passenger of the vehicle 102 in response to video or other sensor data received from the vehicle 102. In other cases, the remote support server 120 may provide navigation services to re-route a vehicle 102 or otherwise assist a vehicle 102 in navigating to a destination. In other examples, the remote support server 120 may provide software or firmware updates to a vehicle 102.

The remote support terminals 110, if present, may be coupled to the remote support server 120 via a local area network connection, a direct wired connection, or via a remote connection through the network 140.

The routing evaluation module 125 obtains information relevant to predicting network performance data and generates navigation routes for a vehicle 102 to a desired destination based in part on the predicted network performance data. In an embodiment, the routing evaluation module 125 may determine a navigation route that weighs the risk of the vehicle 102 encountering areas of low network performance together with other factors such as likelihood of traffic delays, time to the destination, distance to the destination, or other factors. The routing evaluation module 125 may provide a recommended navigation route directly to an autonomous control system or navigation system of a vehicle 102 or to a remote support terminal 110 supporting the vehicle 102. Furthermore, in an embodiment, the routing evaluation module 125 may present a set of possible routes for a teleoperator to select between and provide the teleoperator with visual cues indicative of predicted network performance along various road segments or other factors that may affect navigation decisions. An example embodiment of a routing evaluation module 125 is described in further detail below with respect to FIG. 2.

In a further embodiment, the remote support server 120 may perform additional functions not necessarily attributed to the described modules 125, 130. For example, in an embodiment, the remote support server 120 includes a mechanism for automatic database update download, verification and propagation of updates. Such updates may be implemented either on a replacement basis where newly acquired values are used to overwrite old values, or according to Bayesian principles where each update constitutes a probabilistic shift in belief and depends on a prior probability of a certain parameter value as well as the value itself, or based on any other reasoning.

The plurality of networks 140 represents the communication pathways between the vehicles 102, the remote support terminals 110, and the remote support server 120. In one embodiment, the networks 140 use standard communications technologies and/or protocols and can include the Internet. In another embodiment, the entities on the networks 140 can use custom and/or dedicated data communications technologies. The plurality of networks 140 may comprise networks of different types such as, for example, a public cellular connection, a dedicated or private wireless network, a low-latency satellite uplink, VANET wireless channels (including vehicle-to-vehicle or vehicle-to-infrastructure links), or any combination thereof. Furthermore, the plurality of networks 140 may include multiple networks of the same type operated by different service providers. The network devices 145 may include cell towers, routers, switches, LEO satellite uplink devices, WiFi hotspot devices, VANET devices, or other components that provide network services to the entities connected to the plurality of networks 140. The network devices 145 may be integrated into roadside infrastructure units that are integrated with traffic devices or other roadside systems. The network devices 145 may have varying capabilities and may be spread over a wide geographic area. Thus, different allocations of network resources may be available to vehicles 102 in different locations at different times depending on environmental factors, the capabilities of different network devices 145, and congestion in the area.

In an embodiment, multiple instances of the routing evaluation module 125 or components thereof may execute concurrently to provide support to different vehicles 102. Other components of the routing evaluation module 125 may support multiple vehicles 102 concurrently. Furthermore, in various embodiments, components of the routing evaluation module 125 and the teleoperation support module 130 may execute on the same server or on separate servers that may be remote from each other. In further embodiments, one or more components of the routing evaluation module 125 may instead operate on a vehicle 102. The routing evaluation module 125 and the teleoperation support module 130 may be implemented as one or more non-transitory computer-readable storage mediums that stores instructions executed by one or more processors to perform the functions attributed herein.

Figure 2:
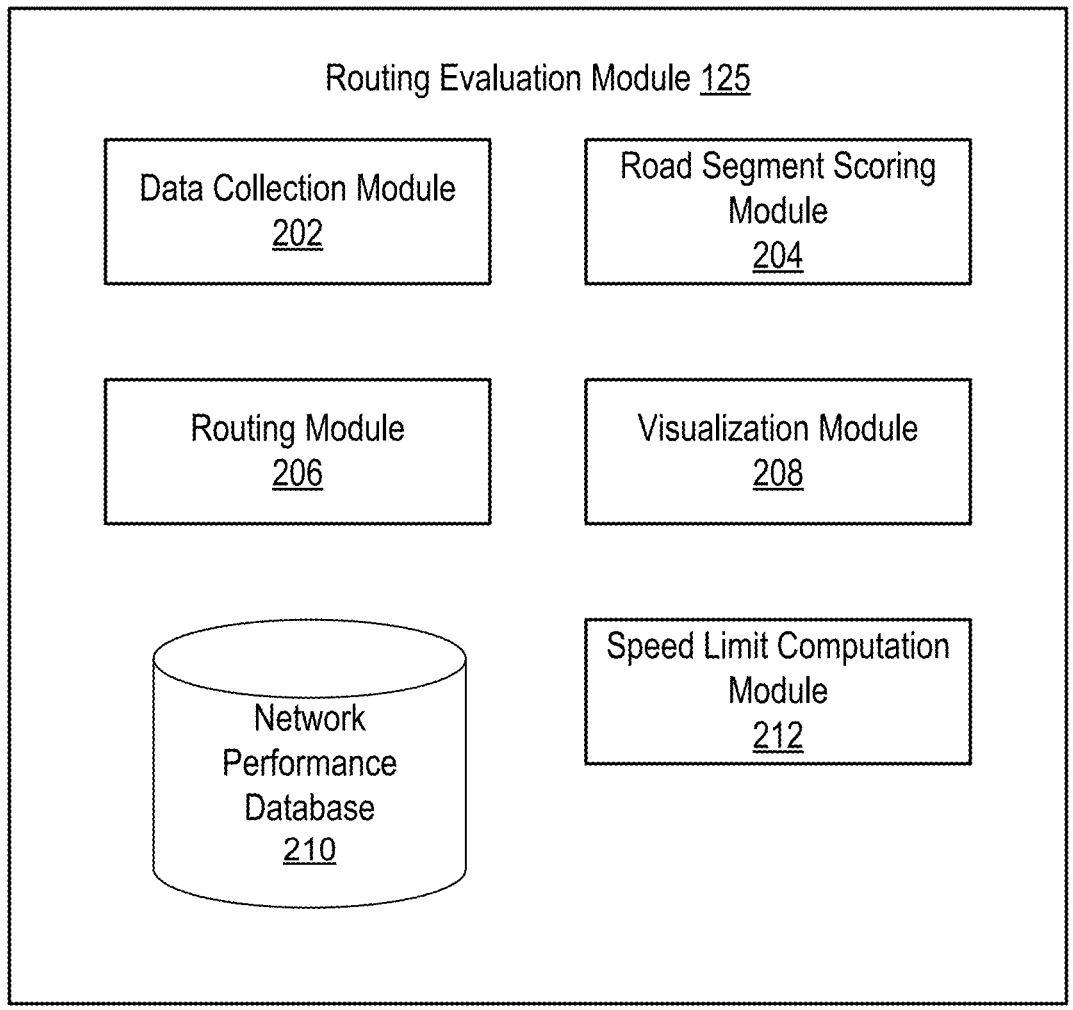
FIG. 2 is a block diagram illustrating an example embodiment of a routing evaluation module.

FIG. 2 illustrates an example embodiment of a routing evaluation module 125. The routing evaluation module 125 comprises a data collection module 202, a road segment scoring module 204, a routing module 206, a visualization module 208, a network performance database 210, and a speed limit computation module 212. In an alternative embodiment, the routing evaluation module 125 comprises different or additional modules.

The data collection module 202 obtains or generates network performance data or other information useful for routing evaluation. The data collection module 202 may obtain data empirically, may extract data using analytical or machine learning methods, or may generate data with various modeling techniques. For example, in one embodiment, a test vehicle 102, fleet of vehicles 102, or another mobile system traverses road segments while transmitting test data to the data collection module 202 and/or receiving test data from the data collection module 202 at a particular data rate. The data collection module 202 acquires various metrics associated with the test communications and stores the metrics in association with the road segment being traversed to the network performance database 210. For example, for a plurality of different locations, the data collection module 202 may record observed latency for each cellular modem of the vehicle 102 or network device 145 associated with the connection. The data collection module 202 may furthermore record other relevant information to the network performance database 210 such as current coordinates and velocity of the vehicle 102, timestamp of the communication, wireless network latency and packet loss levels, visual diversity of a surrounding landscape, a receive power level (e.g., a received signal strength indicator (RSSI)) for each proximal network device 145, directions and distances to known cell tower positions or other parameters that may affect video frame size and encoding time.

In another embodiment, the data collection module 202 generates network performance metrics based on application of a radio-physical model. Here, the data collection module 202 obtains information about the landscape and structures in a target area, positions, orientation and technical parameters of network devices 145 in the target area, as well as optional information such as vehicular traffic levels, air temperature, or space weather events such as magnetic storms that may impact network performance. The data collection module 202 applies the radio-physical model to the input data to generate metrics associated with the target area that predict network performance based on the observed data.

In an embodiment, the radio-physical model models the target area as a quasi-stationary environment. In this case, the metrics are computed based on a snapshot of the currently available data and dynamic properties of the environment are approximated as negligible. In other embodiments, the radio-physical model models the dynamic properties of the environment when computing the metrics for the target area.

In an embodiment, the data collection module 202 may furthermore obtain historical or real-time information about traffic congestion patterns and planned trajectories of the vehicles 102 along different road segments and store this data as auxiliary information that may be useful to predict potential network congestion at certain locations. This predicted network congestion information may be utilized to more accurately predict network performance associated with a particular road segment.

The road segment scoring module 204 applies a utility function to the acquired network performance data from the network performance database 210 (and optionally other data) to compute a utility score for each road segment representing a network performance quality predicted to be observed by a vehicle 102 traversing the road segment. In an embodiment, the utility function may compute a utility score based in part on the expected video frame latency associated with transmission by a vehicle 102 at a plurality of sample points on the road segment. The utility function may furthermore apply a fixed degree of discretization to the expected video frame latency based on the approximate packet round-trip time.

In another embodiment, the road segment scoring module 204 may apply a utility function that computes a utility score based on the time required to transmit a video feed frame from one or more sample points along the road segment. Here, the transmit time may be determined based on the relation between frame byte size and network throughput.

In another embodiment, the road segment scoring module applies a utility function that computes a utility score for a road segment that is adjusted by the mathematical expectation of the time a vehicle 102 spends in that road segment. This adjustment may be based on estimated vehicle speed, traffic congestion levels, traffic signal cycles, as well as any other relevant factors. Such an adjustment reflects the fact that if at some level of abstraction connectivity issues are controlled by a stochastic process during a limited period of time, the probability of a connection failure is proportional to the time spent by a vehicle 102 in a road segment suffering a non-zero connectivity issue probability.

In a further embodiment, the road segment scoring module 204 may apply a utility function that uses multipath network transport latency measurements as an input, and uses a combinatorial search to select the optimal carrier combination for each road segment.

In a further embodiment, the road segment scoring module 204 may assign scores to segment-action pairs instead of assigning scores solely to road segments. For example, a two-way street with both right and left turns allowed at its ends may be assigned seven individual scores, one for each further travel direction and one for the case of the road segment containing the destination point. The utility function of each segment-action pair may in part rely on available utility scores of the road segments that the vehicle 102 would traverse when executing the chosen action on a road segment.

In a further embodiment, the road segment scoring module 204 may additionally use geospatial information on risk sources to compute the utility function. For example, road segments parallel or intersecting with bicycle lanes, or containing public transit stops or uncontrolled crosswalks may be assigned a worse utility score to reflect the higher potential of undesirable outcomes in case of communications issues.

In a further embodiment, the road segment scoring module 204 may additionally use information on the number of cell towers within a given distance from a road segment to compute the utility function.

In a further embodiment, the road segment scoring module 204 may assign scores to some or all individual lanes in a road segment. For example, such an arrangement may be used to account for a higher risk level possessed by a lane adjacent to a highway ramp, or reflect the worse cellular connection quality of a vehicle moving on a fast lane with an imposed minimum speed compared to a stationary or a slow-moving vehicle.

The road segment scoring module 204 may store the utility scores to the network performance database 210.

The routing module 206 obtains the utility scores for each road segment from the network performance database 210, generates possible routes for a particular vehicle 102 from a starting location to a desired destination, and then ranks the possible routes based in part on the utility scores. For example, the ranking algorithm may rank routes based on estimated trip duration and an expectation of the total duration of unsatisfactory network conditions along the route. In an embodiment, the routing module 206 applies a Dijkstra's path-finding algorithm, a search algorithm like A* or variation thereof, or any other applicable algorithm for ranking the possible routes based in part on the utility scores for the road segments. In an embodiment, the routing module 206 provides the highest ranked route to a navigation system of a vehicle 102 or to the teleoperation support module 130 to enable a teleoperator to control the vehicle 102 according to the determined rout. Alternatively, the routing module 206 may provide a subset of the highest ranked routes to the teleoperation support module 130 to enable the teleoperation support module 130 or a human teleoperator at a remote support terminal 110 to select between the routes.

The visualization module 208 generates maps or other visualization data that includes indicators of the determined quality scores for the different road segments. The visualization module 208 may use various methods to present the map and quality score information including, for example, visual, acoustic, and/or haptic feedback indicators. In one embodiment, the visualization module 208 generates a display of a map of the immediate area of the vehicle 102 (such as a city district being traversed by the vehicle 102), and a programmatic overlay using color cues or other visual indicators to highlight road segments according to their respective estimated utility scores. The map may comprise, for example, a north-up, forward-up, or otherwise oriented map.

Figure 4:
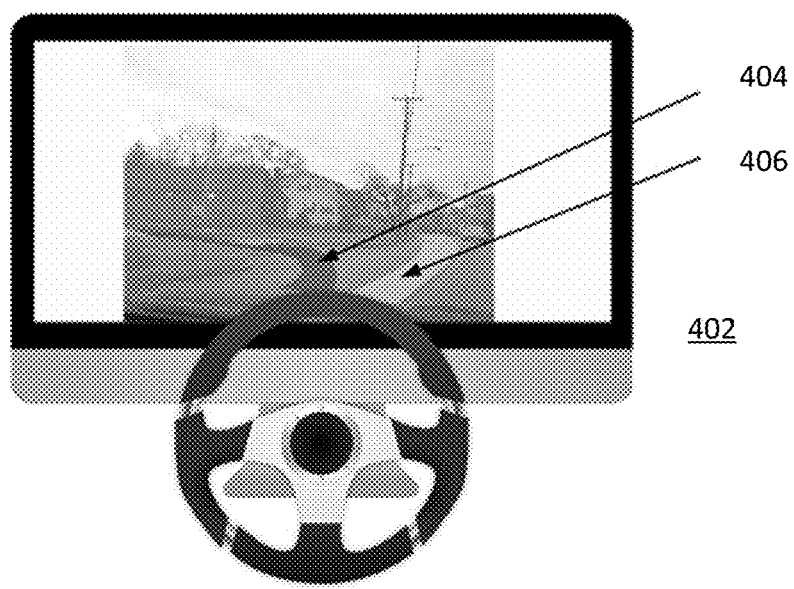
FIG. 4 illustrates an example embodiment of an augmented reality user interface for navigating a vehicle based on predicted wireless performance data.

In another embodiment, the visualization module 308 parses a video feed to detect roads in the video frames and generates a semi-transparent augmented reality (AR) overlay on a vehicle camera view provided to a remote support terminal 110 that highlights or otherwise visually marks road segments within the camera view based on their quality scores. An example embodiment of this view is illustrated in FIG. 4.

In another embodiment, the visualization module 308 generates a semi-transparent augmented reality (AR) overlay on a vehicle camera view displayed at the remote support terminal 110 that visually marks road segments with arrows having widths that vary depending on the respective utility scores for the road segments.

In another embodiment, the visualization module 208 controls the global tint or saturation of the camera views being displayed at the remote support terminal 110 depending on the utility value of the segment being currently traversed by the vehicle 102. In yet another embodiment, the visualization module 208 generates auditory cues or additional visual elements such as blinking warning symbols overlaid on the camera views being displayed at the remote support terminal 110. For example, a warning may be displayed if the utility score of the road segment currently being traversed by the vehicle 102 being supported is below a given threshold value.

In a further embodiment, the visualization module 308 may indicate an estimate of the current vehicle position on the map display, video feed AR overlay, or both if the utility value of the segment being currently traversed is below a given threshold value.

In a further embodiment, the visualization module 308 may generate and display additional information based on the current state of the vehicle 102 and predictions of possible future operator actions. For example, the visualization module 308 may predict and road segments to be avoided due to poor network coverage or other reasons and based on possible navigation routes, may also identify roads segments that provide an acceptable connectivity level but will not allow the vehicle 102 to avoid entering a substandard segment in a future stage of navigation. Additional information reflecting preferences on route planning may be included in the display. For example, the visualization module 308 may mark highways or bridges that are preferred to be avoided. In further embodiments, road segments or geographic areas may be marked to be avoided for reasons unrelated to network performance. For example, road segments or geographic areas with externally imposed limitations (such as restraining orders affecting one or more vehicle occupants) may be marked for avoidance.

The speed limit computation module 212 computes maximum and/or minimum speed limits for a vehicle 102 that enable the vehicle 102 to be safely controlled by a remote teleoperator under observed or inferred network conditions. For example, the speed limit computation module 212 calculates maximum and/or minimum speed limits that allow a teleoperator to react to an unexpected event, given the expected latency of the video transmission and the teleoperator reaction time (e.g., visual and motor reaction time of a human teleoperator or processing latency of an artificial intelligence agent). For example, keeping a sufficient distance from the car ahead (often referred to as the "two-second rule") is a common safety practice in many states that helps the driver to timely react to the car ahead braking unexpectedly. To extend this technique to the case of teleoperated vehicles, in an approximation where the environment may be considered quasi-stationary, (i.e. the evolution of the environment may be represented a sequence of short states where all actors possess constant velocities in each individual state), the total time to react to an event captured on a video frame can be approximated as $T=\tau_{rtt}+\tau_h+\tau_{io}+(8*bytesize/throughput)$ F (MSS, SS), where $\tau_{rtt}$ is the current packet round trip time, $\tau_h$ is the human operator reaction time, $\tau_{io}$ is the total latency induced by camera, display and control device hardware and software stacks, bytesize is the video frame size in bytes, MSS is the maximum segment size or a similar parameter in bytes, SS is the mean segment size used by the video software in bytes, throughput is the rate of successful message delivery over the cellular network in bits per second, and F is an adjustment function reflecting the rules employed by the cellular service provider to prioritize traffic depending on typical segment sizes used by transmission sources). The distance a vehicle 102 travels during this time is D=T*V. Aside from critical cases such as unexpected braking of the leading vehicle, the value of interest is its relative speed $\Delta V$ relative to the characteristic obstacle speed $V_0$ rather than the full speed of the vehicle $V=V_0+\Delta V$. In a further embodiment, similar computations may be performed accounting for first, second or higher order derivatives of generalized coordinates of objects in the environment or their orientations.

In an urban setting it may be safe to approximate as $V_0=0$. However, in a highway the value of $V_0$ (equal to the current lane flow speed) may be non-negligible. Using the above-described techniques, the speed limit computation module 212 may compute various constraints (e.g., maximum and minimum speed) that enable a teleoperator to have sufficient reaction time to an unexpected event and provide this information to the visualization module 208 for display.

In a further embodiment, the recommended vehicle speed limit computation may also use probabilistic reasoning to calculate the mathematical expectation of an obstacle with a given characteristic speed being hit by the vehicle 102, and minimization of the root mean squared value of i for all potential obstacles (which translates into minimizing the kinetic energy of a potential collision).

In a further embodiment, the speed limit computation module 212 may operate in conjunction with the routing module 206 and/or the visualization module 208 to determine if a particular route or a route fragment cannot be traversed under observed or inferred network conditions given legally imposed speed limits and display that information at the remote support terminal 110. For instance, if a road segment imposes a minimum speed limit, and safety requirements indicate that the vehicle 102 must be driven at a lower speed due to a high network latency, such a road segment may be removed from future consideration by the routing module 206, or may be marked as impassable by the visualization module 208.

In an embodiment, the components of the routing evaluation module 125 may adaptively adjust the recommended vehicle speed range, network threshold latency level associated with routing decisions, and/or utility scores for road segments based on information about the particular teleoperator involved with supporting a vehicle 102 in a given situation. For example, the limits may be adjusted based on teleoperator skill scores acquired during a previously conducted operational test or examination. A teleoperator with higher skill scores may be allowed to teleoperator a vehicle 102 on a road segment under higher latency or jitter conditions than a less skilled teleoperator.

Figure 3:
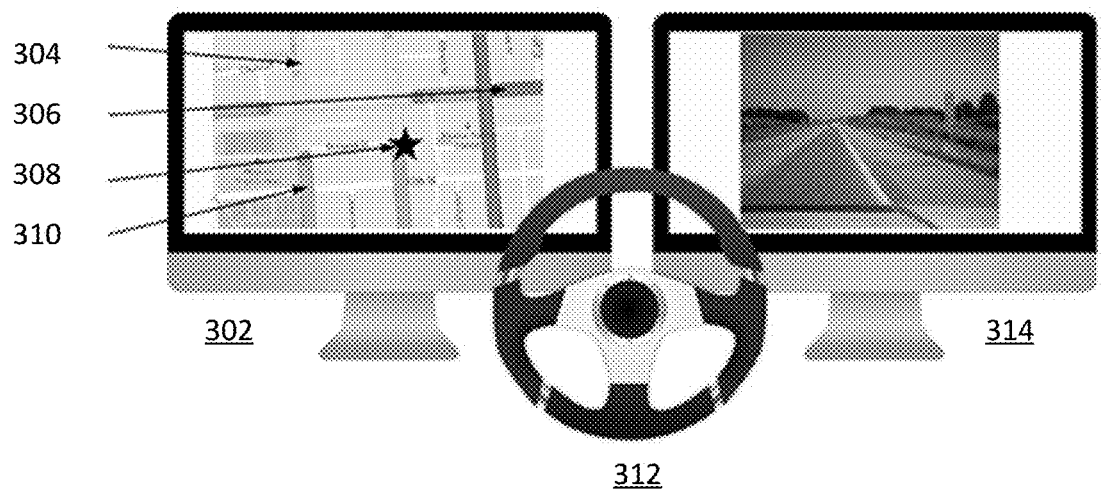
FIG. 3 illustrates an example embodiment of a graphical user interface for navigating a vehicle based on predicted wireless performance data.

FIG. 3 illustrates an example of interfaces available at a remote support terminal 110 for supporting navigation of a vehicle 102. The remote support terminal 110 includes a provides a map display 302, a camera view display 314, and a controller 312. On the map display 302, road segments 304 around the vehicle location 308 with a good expected connection quality may be highlighted in a first color (e.g., green), road segments 310 with poor expected connection quality may be highlighted in a second color (e.g., yellow), and road segments 304 with very poor expected connection quality may be highlighted in a third color (e.g., red). The color scale and the number of steps may be implementation-specific. For instance, instead of a rainbow-based color scheme, a CIE-based color scheme or other variations may be used.

FIG. 4 illustrates an example embodiment of an AR camera view 402 that may be displayed at a remote support terminal 110. The AR camera view 402 is marked with highlights 404 and 406 according to a color scheme such as previously described with respect to FIG. 3.

Figure 5:
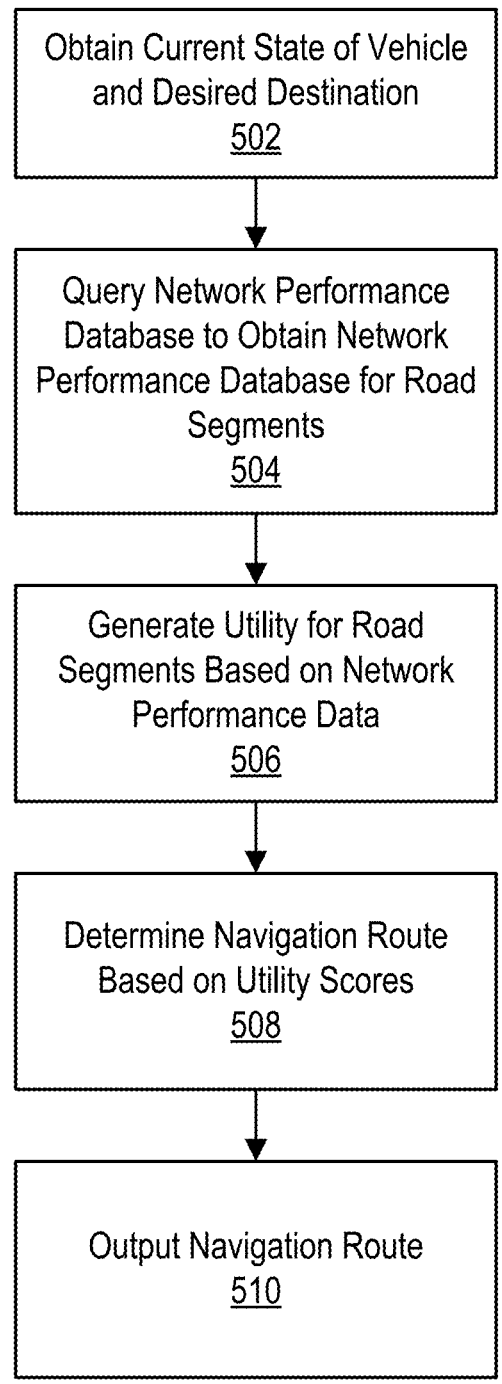
FIG. 5 is a flowchart illustrating an example embodiment of a process for performing a routing evaluation based on predicted network performance data.

FIG. 5 is a flowchart illustrating an example embodiment of a process for evaluating navigation routes based on predicted wireless performance quality. The routing evaluation module 125 obtains 502 a current state of the vehicle 102 and a desired destination. The current state of the vehicle 102 may comprise the vehicle location, and may also include additional vehicle data such as the vehicle speed. The routing evaluation module 125 queries 504 a network performance database 210 to obtain network performance data associated with road segments in the vicinity of the vehicle 102. Here the vicinity may include, for example, road segments within a fixed radius of the vehicle 102 location, road segments within a predefined threshold distance from a direct path between the current vehicle location and the desired destination, or road segments meeting some other predefined or dynamically selected criterion. The routing evaluation module 125 generates 506 utility scores for the respective road segments based on the obtained network performance data. The utility scores may be indicative at least in part of a risk associated with the vehicle 102 encountering an area of poor network connectivity. The routing evaluation module 125 determines 508 a navigation route based on the utility scores. For example, the routing evaluation module 125 may apply an optimization function that optimizes the navigation route based on the utility scores for the available road segments, and further based on other navigation criteria such as the travel time to the destination. The routing evaluation module 125 outputs 510 the navigation route to a vehicle navigation controller. Here, the vehicle navigation controller may comprise a navigation system in the vehicle 102 itself or may comprise the teleoperation support module 130 to enable a teleoperator (e.g., a human teleoperator or artificial intelligent agent) to control the vehicle according to the determined navigation route. In an embodiment, the routing evaluation module 125 may provide a set of possible navigation routes to the teleoperation support module 130 to enable the teleoperator to select between the possible navigation route.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

The invention claimed is:

1. A method for evaluating a vehicle route based on predicted network quality, the method comprising:
obtaining a current state of a vehicle including a vehicle location and a desired destination of the vehicle;
querying, based on the current state of the vehicle, a wireless network performance database to obtain respective wireless network performance data associated with a plurality of road segments within a vicinity of the vehicle location;
generating utility scores for each plurality of road segments based on the respective wireless network performance data, the utility scores representing wireless network performance quality at the associated road segments;

determining a navigation route from the vehicle location to the desired destination based in part on the utility scores;

outputting the navigation route to a vehicle navigation controller;

determining, based on the utility scores for the plurality of road segments, a speed constraint for safely operating the vehicle while traversing each of the plurality of road segments in the navigation route; and outputting the speed constraint, wherein determining the speed constraint comprises:

predicting, based on the utility scores, a latency associated with transmission of a video stream from the vehicle to a remote teleoperation server;

determining an object speed associated with an object;

determining based on the latency, a total estimated time to react to an event comprising the vehicle approaching the object; and determining a maximum speed that enables the remote teleoperation server to prevent the vehicle from colliding with the object given the object speed and the total estimated time to react to the event.

2. The method of claim 1, wherein the vehicle navigation controller comprises a navigation system in the vehicle.

3. The method of claim 1, wherein the vehicle navigation controller comprises the remote teleoperation server that generates controls for controlling navigation of the vehicle.

4. The method of claim 1, wherein outputting the navigation route to the vehicle navigation controller comprises:

generating a navigation map of a geographic region within the vicinity of the vehicle location that includes visual indicators representative of the utility scores associated with the plurality of road segments; and outputting the map.

5. The method of claim 1, wherein outputting the navigation route to the vehicle navigation controller comprises:

generating an augmented reality view of a video stream received from the vehicle that includes visual indicators on road segments in the video stream representative of the utility scores; and outputting the augmented reality view.

6. The method of claim 1, wherein determining the navigation route comprises:

obtaining speed limits associated with the plurality of road segments; and determining a subset of the plurality of road segments having speed limits within the speed constraint; and determining the navigation route based on the subset of the plurality of road segments.

7. A non-transitory computer readable storage medium storing instructions for evaluating a vehicle route based on predicted network quality, the instructions when executed by a processor causing the processor to perform steps including:

obtaining a current state of a vehicle including a vehicle location and a desired destination of the vehicle;

querying, based on the current state of the vehicle, a wireless network performance database to obtain respective wireless network performance data associated with a plurality of road segments within a vicinity of the vehicle location;

generating utility scores for each plurality of road segments based on the respective wireless network performance data, the utility scores representing wireless network performance quality at the associated road segments;

determining a navigation route from the vehicle location to the desired destination based in part on the utility scores;

outputting the navigation route to a vehicle navigation controller;

determining, based on the utility scores for the plurality of road segments, a speed constraint for safely operating the vehicle while traversing each of the plurality of road segments in the navigation route; and outputting the speed constraint, wherein determining the speed constraint comprises:

predicting, based on the utility scores, a latency associated with transmission of a video stream from the vehicle to a remote teleoperation server;

determining an object speed associated with an object;

determining based on the latency, a total estimated time to react to an event comprising the vehicle approaching the object; and determining a maximum speed that enables the remote teleoperation server to prevent the vehicle from colliding with the object given the object speed and the total estimated time to react to the event.

8. The non-transitory computer readable storage medium of claim 7, wherein the vehicle navigation controller comprises a navigation system in the vehicle.

9. The non-transitory computer readable storage medium of claim 7, wherein the vehicle navigation controller comprises the remote teleoperation server that generates controls for controlling navigation of the vehicle.

10. The non-transitory computer readable storage medium of claim 7, wherein outputting the navigation route to the vehicle navigation controller comprises:

generating a navigation map of a geographic region within the vicinity of the vehicle location that includes visual indicators representative of the utility scores associated with the plurality of road segments; and outputting the map.

11. The non-transitory computer readable storage medium of claim 7, wherein outputting the navigation route to the vehicle navigation controller comprises:

generating an augmented reality view of a video stream received from the vehicle that includes visual indicators on road segments in the video stream representative of the utility scores; and outputting the augmented reality view.

12. The non-transitory computer readable storage medium of claim 7, wherein determining the navigation route comprises:

obtaining speed limits associated with the plurality of road segments; and determining a subset of the plurality of road segments having speed limits within the speed constraint; and determining the navigation route based on the subset of the plurality of road segments.

13. A computer system comprising:

a processor; and a non-transitory computer readable storage medium storing instructions for evaluating a vehicle route based on predicted network quality, the instructions when executed by the processor causing the processor to perform steps including:

obtaining a current state of a vehicle including a vehicle location and a desired destination of the vehicle;

querying, based on the current state of the vehicle, a wireless network performance database to obtain respective wireless network performance data associated with a plurality of road segments within a vicinity of the vehicle location;

generating utility scores for each plurality of road segments based on the respective wireless network performance data, the utility scores representing wireless network performance quality at the associated road segments;

determining a navigation route from the vehicle location to the desired destination based in part on the utility scores;

outputting the navigation route to a vehicle navigation controller;

determining, based on the utility scores for the plurality of road segments, a speed constraint for safely operating the vehicle while traversing each of the plurality of road segments in the navigation route; and outputting the speed constraint, wherein determining the speed constraint comprises:

predicting, based on the utility scores, a latency associated with transmission of a video stream from the vehicle to a remote teleoperation server;

determining an object speed associated with an object;

determining based on the latency, a total estimated time to react to an event comprising the vehicle approaching the object; and determining a maximum speed that enables the remote teleoperation server to prevent the vehicle from colliding with the object given the object speed and the total estimated time to react to the event.

14. The computer system of claim 13, wherein the vehicle navigation controller comprises a navigation system in the vehicle.

15. The computer system of claim 13, wherein the vehicle navigation controller comprises the remote teleoperation server that generates controls for controlling navigation of the vehicle.

16. The computer system of claim 13, wherein outputting the navigation route to the vehicle navigation controller comprises:

generating a navigation map of a geographic region within the vicinity of the vehicle location that includes visual indicators representative of the utility scores associated with the plurality of road segments; and outputting the map.

\* \* \* \* \*